United States Patent [19]

Bourgein

[11] Patent Number: 4,492,028
[45] Date of Patent: Jan. 8, 1985

[54] WALL MOUNTED KNIFE HOLDER

[76] Inventor: John Bourgein, 2660 Union St., Oakland, Calif. 94607

[21] Appl. No.: 441,671

[22] Filed: Nov. 15, 1982

[51] Int. Cl.³ .............................................. A47F 5/08
[52] U.S. Cl. ................................ 30/296 A; 211/60 T; 211/89
[58] Field of Search ................. 30/296 R, 296 A, 231; 211/60 T, 88, 89, 96, 99; 24/303

[56] References Cited

U.S. PATENT DOCUMENTS

| | | | |
|---|---|---|---|
| 2,434,242 | 1/1948 | Hermes | 211/99 |
| 2,484,535 | 10/1949 | Stader | 211/99 |
| 2,522,213 | 9/1950 | Doniger | 211/60 T |
| 3,889,809 | 6/1975 | McNair | 211/60 T |
| 4,082,386 | 4/1978 | Beasley | 30/296 A |
| 4,183,439 | 1/1980 | Bell | 211/60 T |
| 4,249,267 | 2/1981 | Voss | 24/303 |

Primary Examiner—Jimmy C. Peters
Attorney, Agent, or Firm—H. Michael Brucker

[57] ABSTRACT

A wall mounted knife holder which is operatively disposed on a vertical wall and which has an operative position generally parallel to the wall to which it is secured and an operative position in which it is tilted away from the wall whereby in its tilted position cutlery can be withdrawn from the holder without engaging overhead cabinetry.

1 Claim, 5 Drawing Figures

WALL MOUNTED KNIFE HOLDER

BACKGROUND OF THE INVENTION

Knife blocks for holding and protecting cutlery are generally characterized by a substantially solid block of material, normally wood, which has a number of parallel spaced slots which are subdivided to receive knives of varying blade sizes. Knife blocks of this description normally rest on a counter top where the knives which they hold are convenient for use during the preparation of food. Since modern kitchens frequently are built with a minimum of counter space, the use of a conventional knife block requires the choice of either using a portion of that counter space or locating the knife block in a place less convenient than desirable.

The present invention provides a knife holder which can be conveniently located relative to the work space where food is prepared without requiring the dedication of any counter top space.

In addition to the above, the knife holder of the present invention is designed to be affixed to a wall which defines the vertical space between a counter top and an overhanging cabinet which is frequently considered "dead space" of little utility.

DETAILED DESCRIPTION OF THE ILLUSTRATED EMBODIMENTS

Figure 1:
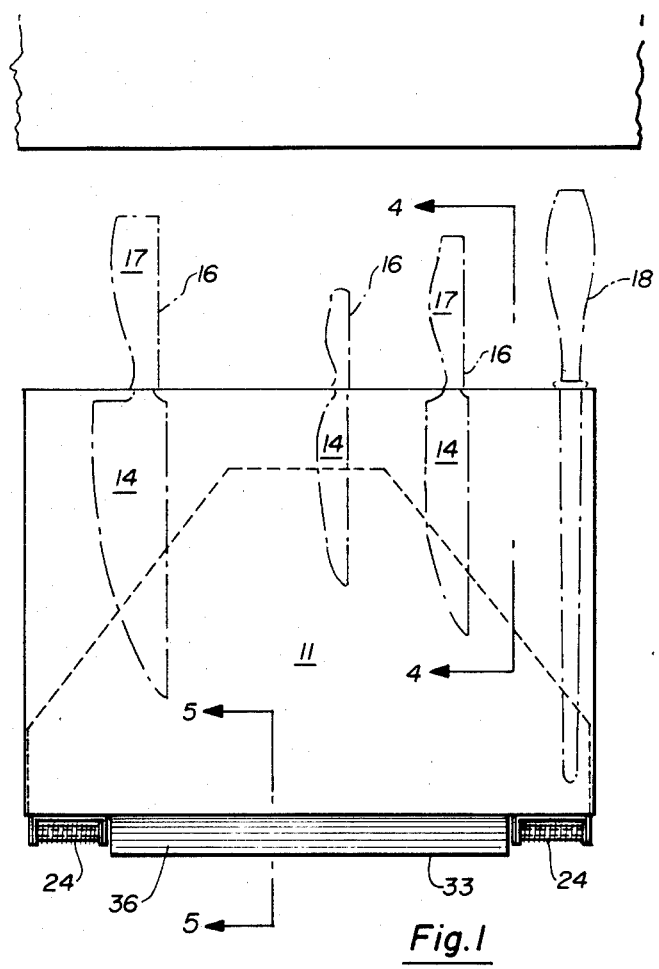
FIG. 1 is an elevation of the knife holder of the present invention shown in situe mounted to a wall beneath a cabinet with a number of knives and a sharpening steel operatively disposed within the knife holder.
Figure 2:
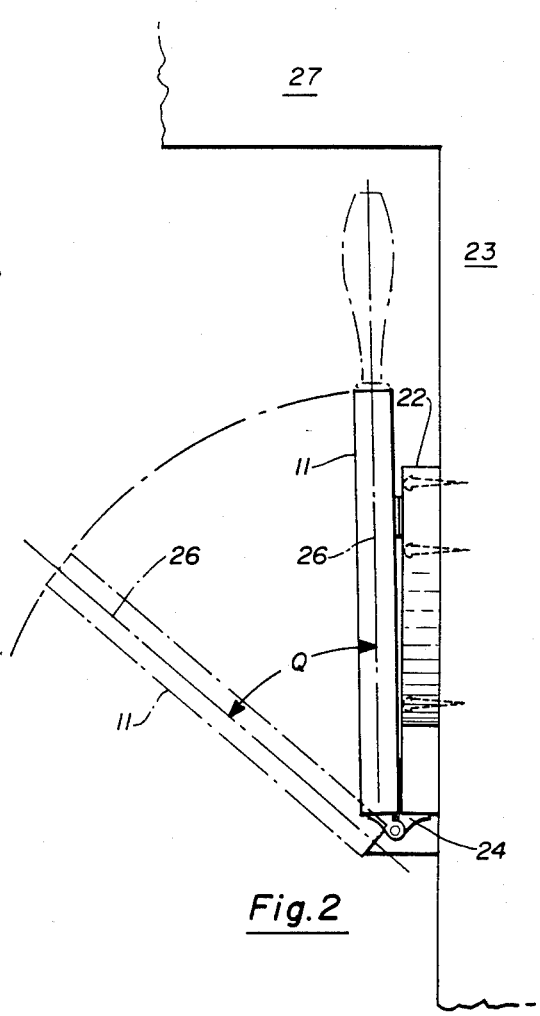
FIG. 2 is a side elevation of FIG. 1 wherein the portion of the invention which holds the knife blades and sharpening steel is illustrated in its two operative positions.

Refering to the drawings, a generally rectangular housing 11 has formed therein a narrow slot 12 having an enlarged portion 13 at one end. Slot 12 is dimensioned to receive the blades 14 of knives 16 and to be too narrow to permit the passage of the handles 17 of the knives. The enlarged portion 13 of slot 12 is dimensioned to receive a sharpening steel 18. A strip of magnetic material 19 is affixed along one interior edge 21 of slot 12 and operates to hold the knives in a fixed position along slot 12. Housing 11 is affixed to a securing member 22 which provides a means for securing the housing 11 to a vertical member such as wall 23. Housing 11 is connected to securing member 22 by spring-loaded hinge members 24 which provide positioning means for housing 11.

Housing 11 has a first operative position in which its longitudinal axis 26 is substantially parallel to the member 23 and thus vertical. When the knife holder of the present invention is secured to a wall 23 below a cabinet 27, it would not be possible to remove a knife 16 or the steel 18 from the knife holder by withdrawing it vertically along its longitudinal axis since it would contact the cabinet 27 before being clear of the housing 11.

Housing 11 has a second operative position wherein the longitudinal axis 26 forms an angle Q with the vertical member 23 to which the securing member 22 is affixed. In its second operative position, a knife 16 or steel 18 can be easily removed from the housing 11 without engaging the cupboard 27.

Spring-loaded hinge members 24 secure housing 11 to member 22 in such a way as to permit the housing member 11 to assume a substantially vertical position parallel to the securing member 23 and also to rotate through the angle Q while at all times maintaining a secure connection between the housing 11 and the member 22.

Figure 3:
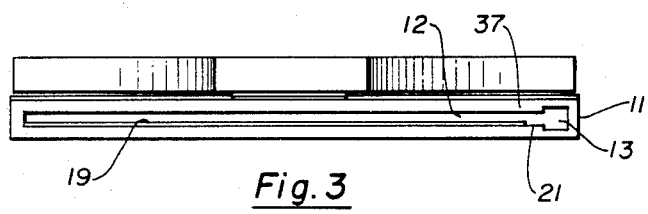
FIG. 3 is a plan view of FIG. 1 without any implements in place.
Figure 5:
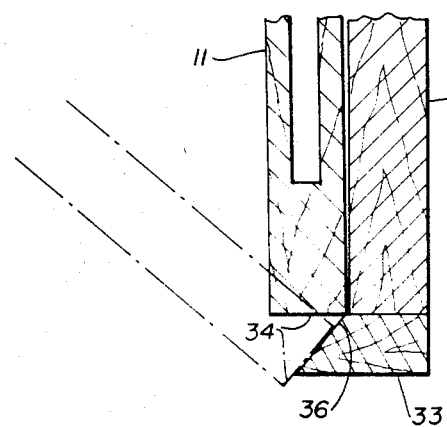
FIG. 5 is a sectional view taken along line 5—5 of FIG. 1 showing the invention in its second operative position.
Figure 4:
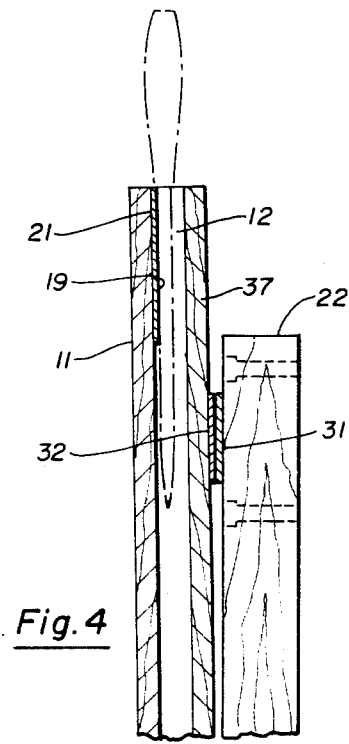
FIG. 4 is a sectional view taken along the 4—4 of FIG. 1 illustrating the mechanism by which the moveable portion of the invention is maintained in one of its operative positions.

A magnetic strip 31 affixed to member 22 engages a like dimensioned magnetic strip 32 when housing 11 is in its first (vertical) position whereby it is maintained in that position. It is obvious, of course, that the magnetic strips 31 and 32 are but one of several well known equivalent means by which the housing 11 can be releasably secured to the member 23 so as to maintain its vertical position. A stop member 33 is affixed to the bottom of securing member 23 and an angled face 36 as best seen in FIG. 3. When housing member 11 is rotated through an angle Q from the vertical, the bottom end 34 of housing member 11 registers with the angled face 36 of stop member 33 and is prevented from rotating further. Obviously by altering the angle of face 36, the angle value of Q can be changed.

The invention is designed to permit the housing 11 to be tilted away from the wall 23 at a sufficient angle to permit the knives 16 or steel 18 to be withdrawn from the housing without interference from an overhanging cabinet such as cabinet 27. It is anticipated that the angle Q will be greater than 30 degrees and less than 90 degrees.

The stop member 33 is but one of several well known equivalent means of locating the second position of housing 11 in which position knives or sharpening steels can be readily withdrawn.

In operation the knife holder will contain a plurality of knives and a sharpening steel flush against a wall such as 23 in close proximity to food preparation areas without occupying any actual counter space. When it becomes necessary to withdraw a knife from the housing 11, the housing is simply positioned to its second position and the desired piece of cutlery is conveniently and easily withdrawn.

In one embodiment of the invention, the housing-forming member 37 to which the magnetic strip 32 is attached and which is closest to wall 23 when the housing is in its vertical position can be made from a transparent or translucent material to form a window through which when a user can locate the desired knife without having to withdraw several until that which is required has been found.

It will be appreciated while particular embodiments of the invention have been shown and described, modifications may be made. It is intended in the following claims to cover all such modifications which come within the spirit and the scope of the invention.

What is claimed is:

1. A wall mounted cutlery holder which can be used on a wall directly below a cabinet comprising in combination:

a housing defining a narrow slot for receiving a plurality of cutlery knives, wherein said slot is wide enough to receive the blade of a knife and narrow enough to block the passage of a knife handle whereby a knife inserted into said housing slot will have the blade protected within the housing and its handle protruding from said housing;

a securing member for attachment to a wall, said securing member connected to said housing by hinge means whereby when said securing member is attached to a wall said housing can pivot between a first position in which the longitudinal axis of the slot in said housing is generally vertical whereby cutlery in the slot will be parallel to the wall and a second position in which the longitudinal axis of the slot wil be at an angle of between 30 degrees and 90 degrees from vertical and the wall; and housing position means selectively holding said housing in either its first position or its second position, whereby in its first position cutlery is conveniently stored in said housing parallel to a wall to which said securing member may be attached even if said wall is immediately below a cabinet, and further whereby in its second position cutlery is easily removable from and insertable into said housing due to the angle of the slot axis relative to the wall and any overhanging cabinetry.

* * * * *